United States Patent
He

(10) Patent No.: US 9,678,394 B2
(45) Date of Patent: Jun. 13, 2017

(54) DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Chunyan He, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 284 days.

(21) Appl. No.: 14/694,926

(22) Filed: Apr. 23, 2015

(65) Prior Publication Data

US 2016/0187734 A1    Jun. 30, 2016

(30) Foreign Application Priority Data

Dec. 30, 2014  (CN) .......................... 2014 1 0844466

(51) Int. Cl.
*G02F 1/1335* (2006.01)
*G02F 1/1343* (2006.01)
*F21V 8/00* (2006.01)
*G02F 1/1337* (2006.01)

(52) U.S. Cl.
CPC ..... *G02F 1/134309* (2013.01); *G02B 6/0065* (2013.01); *G02F 1/133707* (2013.01)

(58) Field of Classification Search
CPC ......... G02F 1/133707; G02F 1/134309; G02B 6/0065
USPC ........................................ 349/61–63
See application file for complete search history.

(56) References Cited

U.S. PATENT DOCUMENTS

| | | | |
|---|---|---|---|
| 6,633,353 B1 * | 10/2003 | Seki ....................... | G02B 5/201 349/106 |
| 2002/0012084 A1 * | 1/2002 | Yoon ................. | G02F 1/133707 349/108 |
| 2010/0253897 A1 * | 10/2010 | Ohgami ............ | G02F 1/134309 349/142 |
| 2011/0025970 A1 * | 2/2011 | Hashimoto ....... | G02F 1/134309 349/139 |

FOREIGN PATENT DOCUMENTS

| | | |
|---|---|---|
| CN | 102155674 A | 8/2011 |
| CN | 202995198 U | 6/2013 |

* cited by examiner

*Primary Examiner* — Hoan C Nguyen
(74) *Attorney, Agent, or Firm* — Anova Law Group, PLLC

(57) ABSTRACT

A display panel is disclosed. The display panel includes a backlight module and first and second substrates. The first substrate comprises pixel elements arranged in an array, each including a sub-pixel element having a first slit electrode therein. The first substrate is divided into N zones. In addition, there are a uniform electrode sheet width and a uniform electrode slit width of the first slit electrodes in the pixel elements in each zone, the electrode sheet width of the first slit electrodes in the pixel elements in the i-th zone is less than the electrode sheet width of the first slit electrodes in the pixel elements in the (i+1)-th zone, and the electrode slit width of the first slit electrodes in the pixel elements in the i-th zone is greater than the electrode slit width of the first slit electrodes in the pixel elements in the (i+1)-th zone.

13 Claims, 3 Drawing Sheets

DISPLAY PANEL AND DISPLAY DEVICE

CROSS-REFERENCES TO RELATED APPLICATIONS

This application claims the benefit of priority of Chinese Patent Application No. 201410844466.X, filed with the Chinese Patent Office on Dec. 30, 2014 and entitled "DISPLAY PANEL AND DISPLAY DEVICE", the content of which is incorporated herein by reference in its entirety.

TECHNICAL FIELD

The present disclosure relates to the field of display technologies, and more particularly to a display panel and a display device.

BACKGROUND OF THE INVENTION

Processes of manufacturing a Liquid Crystal Display (LCD) have been growingly developed along with the rapid advancement of display technologies. The LCD displays using a backlight provided by a backlight source. At present the LCD is generally provided with a backlight by a sided-illuminating backlight module. As illustrated in FIG. 1, there is a schematic diagram of an LCD provided with a backlight by a sided-illuminating backlight module in the prior art. In FIG. 1, a backlight source 101 provides a liquid crystal panel 104 with a backlight through a light guider 103. A reflection film 102 reflects light passing the light guider 103 uniformly into the liquid crystal panel 104. The light guider 103 absorbs the light in different colors to some extent so that there may be differences in color in zones of the liquid crystal panel 104 at respective distances from the backlight source 101, thus resulting in the problem of non-uniformity in color displayed on the liquid crystal panel.

BRIEF SUMMARY OF THE INVENTION

One inventive aspect is a display panel. The display panel includes a sided-illuminating backlight module, a first substrate, and a second substrate. The sided-illuminating backlight module includes a light guider, and a backlight source. The first substrate comprises a plurality of pixel elements arranged in an array, each including a sub-pixel element in a first color and having a first slit electrode therein. The first substrate is divided into N zones at respective distances from the backlight source in the horizontal direction, where N is a positive integer. In addition, there are a uniform electrode sheet width and a uniform electrode slit width of the first slit electrodes in the pixel elements in each zone, the electrode sheet width of the first slit electrodes in the pixel elements in the i-th zone is less than the electrode sheet width of the first slit electrodes in the pixel elements in the (i+1)-th zone, the electrode slit width of the first slit electrodes in the pixel elements in the i-th zone is greater than the electrode slit width of the first slit electrodes in the pixel elements in the (i+1)-th zone, $1 \leq i < N$, and the i-th zone is at a shorter distance from the backlight source than the (i+1)-th zone.

Another inventive aspect is a display device, including a display panel. The display panel includes a sided-illuminating backlight module, a first substrate, and a second substrate. The sided-illuminating backlight module includes a light guider, and a backlight source. The first substrate comprises a plurality of pixel elements arranged in an array, each including a sub-pixel element in a first color and having a first slit electrode therein. The first substrate is divided into N zones at respective distances from the backlight source in the horizontal direction, where N is a positive integer. In addition, there are a uniform electrode sheet width and a uniform electrode slit width of the first slit electrodes in the pixel elements in each zone, the electrode sheet width of the first slit electrodes in the pixel elements in the i-th zone is less than the electrode sheet width of the first slit electrodes in the pixel elements in the (i+1)-th zone, the electrode slit width of the first slit electrodes in the pixel elements in the i-th zone is greater than the electrode slit width of the first slit electrodes in the pixel elements in the (i+1)-th zone, $1 \leq i < N$, and the i-th zone is at a shorter distance from the backlight source than the (i+1)-th zone.

BRIEF DESCRIPTION OF THE DRAWINGS

In order to describe more clearly the technical solutions according to the embodiments of the disclosure, the drawings to which reference is made in the description of the embodiments will be described briefly below, and evidently the drawings described below are merely illustrative of some of the embodiments of the disclosure, and those ordinarily skilled in the art can further derive other drawings from these drawings without any inventive effort. In the drawings.

DETAILED DESCRIPTION OF THE PREFERRED EMBODIMENTS

In order to make the objects, technical solutions and advantages of the disclosure more apparent, the disclosure will be described below in further details with reference to the drawings, and evidently the embodiments described below are merely a part but not all of the embodiments of the disclosure.

In the embodiments of the disclosure, in order to address the problem of non-uniformity in color displayed on a liquid crystal display, as identified from tests, a light guider absorbs light in different colors to some extent so that there may be differences in color in zones of a liquid crystal panel at respective distances from a backlight source in the light guidance direction of the light guider, thus resulting in non-uniformity in color displayed on the liquid crystal panel. In this embodiment, the light guider absorbs a part of light in a first color emitted from a light source, and a first substrate is divided into a plurality of zones, where the electrode plate width of and the electrode slit width of a first slit electrode in a sub-pixel element in the first color in a pixel element in each zone are different from those in another zone, so that the sub-pixel elements in the first color in the pixel elements in the different zones display at different transmissivities to thereby adjust chromas displayed on the display panel in the different zones. The disclosure will be described below in details with respect to particular embodiments thereof As illustrated in FIG. 2, there is a schematic diagram of a display panel according to an embodiment of the disclosure in a sectional view.

Figure 1:
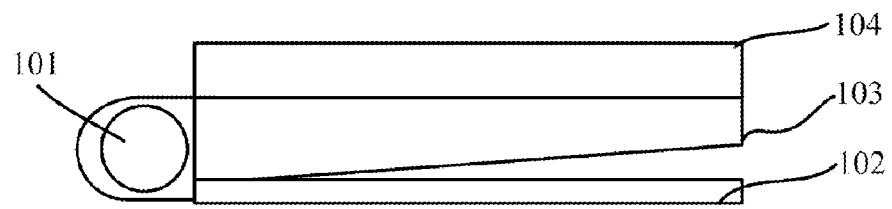
FIG. 1 illustrates a schematic diagram of an LCD provided with a backlight by a sided-illuminating backlight module in the prior art.
Figure 2:
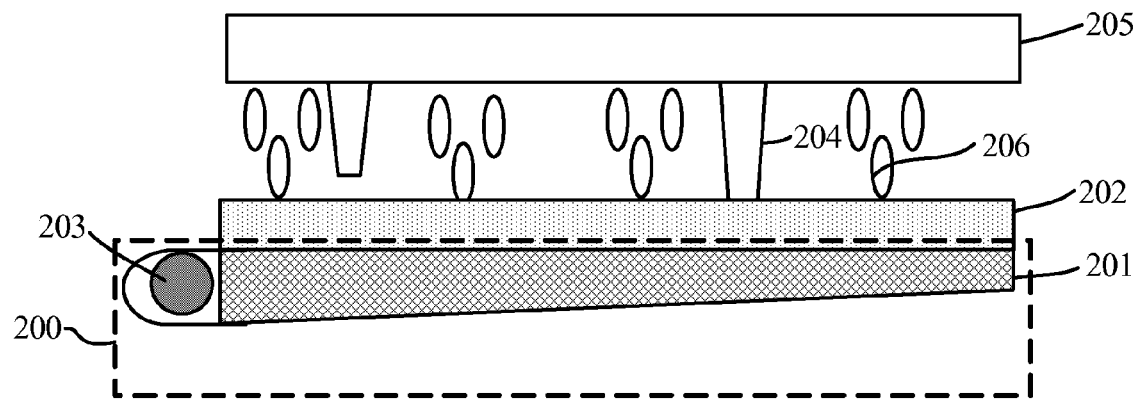
FIG. 2 illustrates a schematic diagram of a display panel according to an embodiment of the disclosure in a sectional view.

The display panel in FIG. 2 includes a sided-illuminating backlight module 200, a first substrate 202, and a second substrate 205, where the sided-illuminating backlight module 200 includes a light guider plate 201, and a backlight source 203 on a side of the backlight module 200. The display panel in FIG. 2 further includes liquid crystal molecules 206, support posts 204, etc., arranged between the first substrate 202 and the second substrate 205.

Figure 3:
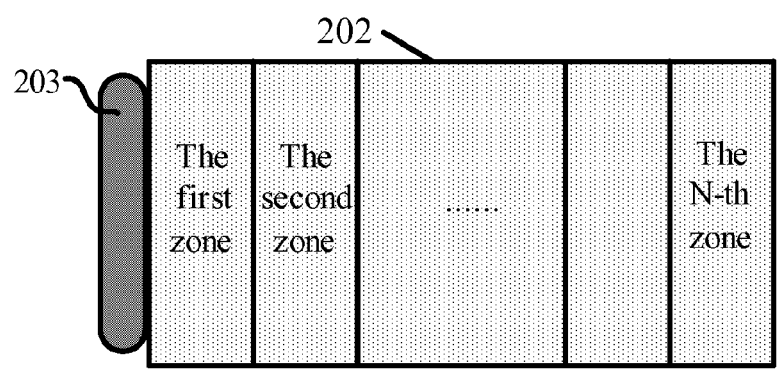
FIG. 3 illustrates a top view of a relationship in location between a backlight source and a first substrate according to the embodiment of the disclosure.

FIG. 3 illustrates a top view of a relationship in location between the backlight source 203 and the first substrate 202 according to an embodiment of the disclosure. As illustrated in FIG. 2 and FIG. 3, the backlight source 203 is arranged on a side of the first substrate 202, and the first substrate 202 is divided into N zones at respective distances of the first substrate 202 from the backlight source 203 in the horizontal direction, where the first zone is at the shortest distance from the backlight source 203, and the N-th area is at the longest distance from the backlight source, and pixels are arranged differently in the different zones, where N is a positive integer, particularly as illustrated in FIG. 4.

Figure 4:
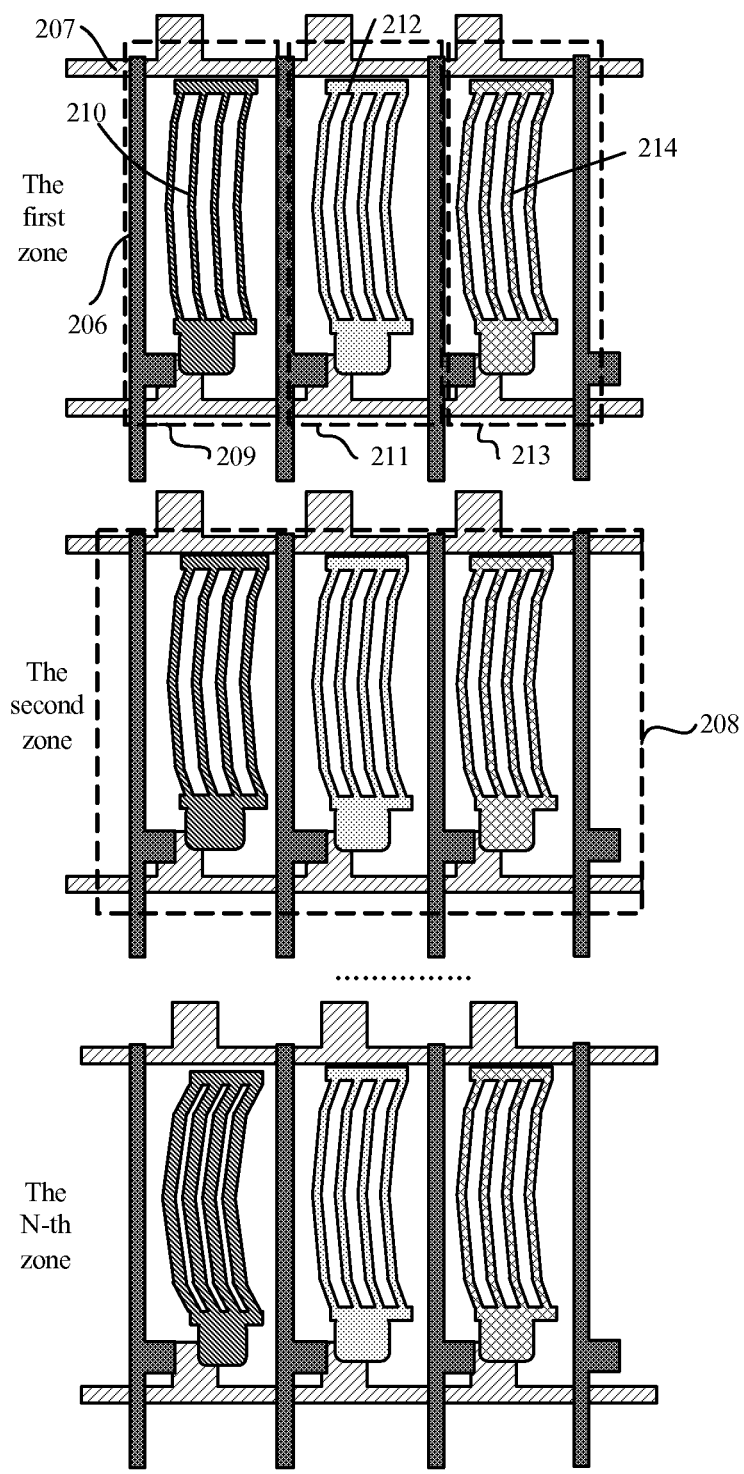
FIG. 4 illustrates a schematic structural diagram of pixels on the first substrate according to the embodiment of the disclosure.

As illustrated in FIG. 4, there is a schematic structural diagram of pixels on the first substrate according to the embodiment of the disclosure. In FIG. 4, the first substrate 202 is divided into N zones, in each of which a plurality of pixel elements 208 are arranged in an array, and each pixel element 208 includes a sub-pixel element 209 in a first color and having a first slit electrode 210 therein; and there are a uniform electrode sheet width and a uniform electrode slit width of the first slit electrodes 210 in the pixel elements 208 in each zone; and The electrode sheet width of the first slit electrodes 210 in the pixel elements 208 in the i-th zone is less than the electrode sheet width of the first slit electrodes 210 in the pixel elements 208 in the (i+1)-th zone, and the electrode slit width of the first slit electrodes 210 in the pixel elements 208 in the i-th zone is greater than the electrode slit width of the first slit electrodes 210 in the pixel elements 208 in the (i+1)-th zone, where $1 \leq i < N$, and the i-th zone is at a shorter distance from the backlight source 203 than the (i+1)-th zone.

Preferably there is a uniform size of the N zones into which the display panel is divided.

Figure 5:
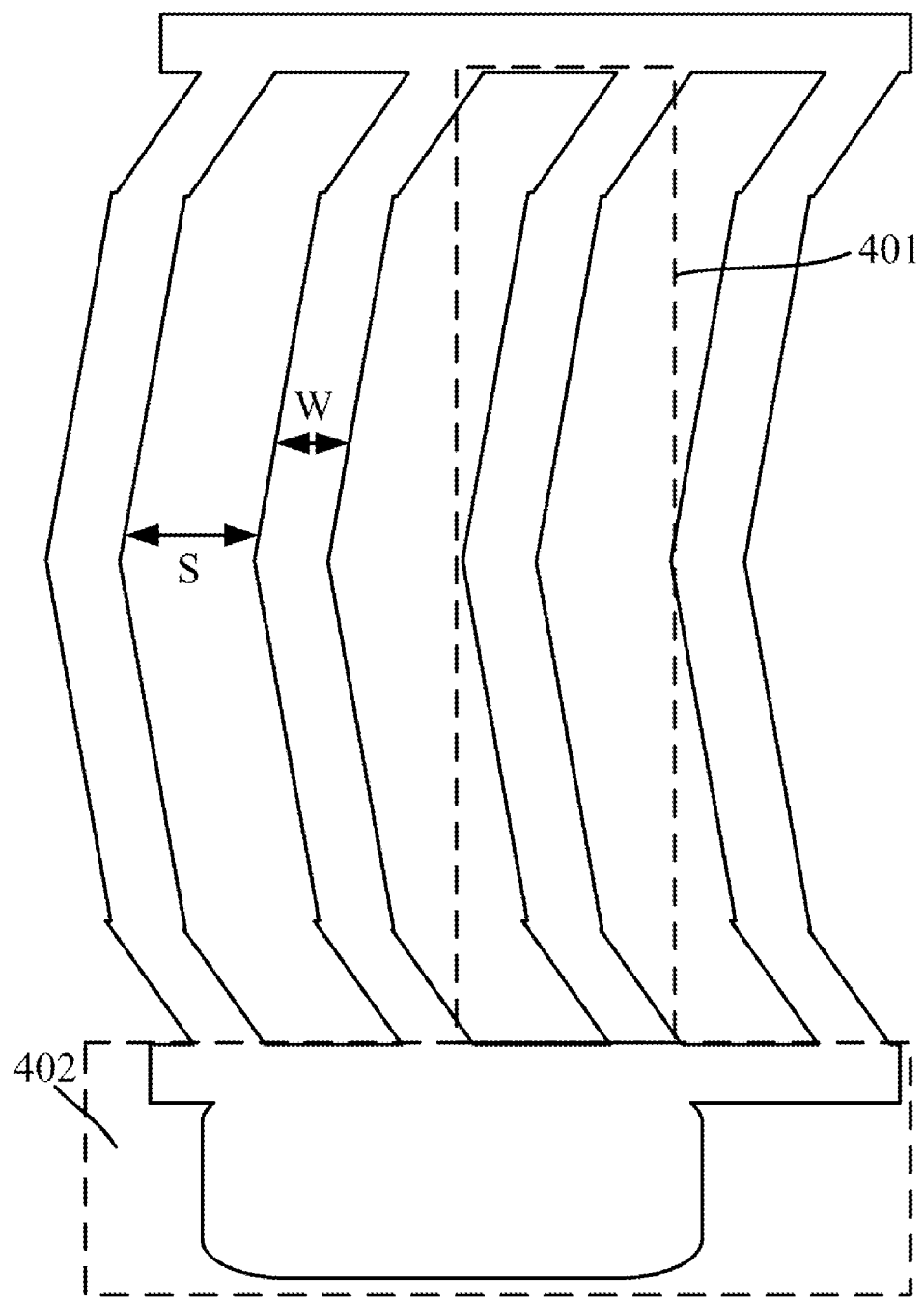
FIG. 5 illustrates a schematic diagram of slit electrodes according to the embodiment of the disclosure.

Furthermore each pixel element 208 further includes a sub-pixel element 211 in a second color, and a sub-pixel element 213 in a third color. The sub-pixel element 209 in the first color, the sub-pixel element 211 in the second color, and the sub-pixel element 213 in the third color in each pixel element 208 are surrounded by a plurality of data lines 206 and a plurality of scan lines 207. A second slit electrode 212 is arranged in the sub-pixel element 211 in the second color, and a third slit electrode 214 is arranged in the sub-pixel element 213 in the third color; and the second slit electrode 212 and the third slit electrode 214 in the respective pixel element are shaped the same as the first slit electrode 210. Particularly as illustrated in FIG. 5, there is a schematic diagram of a slit electrode according to an embodiment of the disclosure. In FIG. 5, the slit electrode includes a plurality of electrode sheets 401 arranged in parallel, and a body 402 of the slit electrode, and the respective electrode sheets 401 in the slit electrode are connected through the body 402, where W represents the width of the electrode sheets 401 in the slit electrode, and S represents the electrode slit width of the slit electrode.

In the prior art, there are a uniform electrode sheet width and a uniform electrode slit width of the slit electrodes in the respective sub-pixel elements in the colors in each pixel element 208 throughout the display panel, and at this time there is a uniform transmissivity of the respective sub-pixel elements in the colors in each pixel element 208. When the light guider 201 is made of poly (methyl methacrylate), poly (methyl methacrylate) will absorb a part of blue light in the light guider 201 when the light passes the light guider 201, so when the light in the light guider 201 propagates, poly (methyl methacrylate) absorbs more blue light over a longer distance over which the light travels, so that there are a yellowish chroma in a zone at a longer distance from the backlight source 203, and a g bluish chroma in a zone at a shorter distance from the backlight source 203, displayed on the display panel, thus resulting the problem of non-uniformity in chroma.

In the embodiment of the disclosure, the light guider 201 is made of poly (methyl methacrylate), and the sub-pixel element 209 in the first color is a blue sub-pixel element. The sub-pixel element 211 in the second color is a red sub-pixel element, and the sub-pixel element 213 in the third color is a green sub-pixel element; or the sub-pixel element 211 in the second color is a green sub-pixel element, and the sub-pixel element 213 in the third color is a red sub-pixel element. In the embodiment of the disclosure, the sub-pixel element 211 in the second color is described as a red sub-pixel element and the sub-pixel element 213 in the third color is described as a green sub-pixel element merely by way of an example, and reference can be made to the description of the embodiment of the disclosure for the sub-pixel element 211 in the second color being a green sub-pixel element and the sub-pixel element 213 in the third color being a red sub-pixel element, so a repeated description thereof will be omitted here.

In the embodiment of the disclosure, the first substrate 202 is divided into N zones, where the electrode sheet width W and the electrode slit width S of the first slit electrodes 210 in the blue sub-pixel elements in the pixel elements 208 in each zone are different from those in another zone in such a way that the electrode sheet width W of the first slit electrodes 210 in the blue sub-pixel elements in a zone in the first substrate 201 at a longer distance from the backlight source 203 is set wider and the electrode slit width S of these first slit electrodes 210 is set narrower, so that more light is transmitted through the blue sub-pixel elements in the zone at a longer distance from the backlight source 203, so more blue light is transmitted in the zone, thereby compensating for blue light in the zone in the display substrate at a longer distance from the backlight source 203 so as to address the problem of non-uniformity in chroma displayed on the display panel. Moreover since the light guider 201 does not absorb red light and green light, the electrode sheet width of the second slit electrodes 212 and the electrode sheet width of the third slit electrodes 213 are set the same, and also the electrode slit width of the second slit electrodes 212 and the electrode slit width of the third slit electrodes 213 are set the same, in each zone.

Referring to FIG. 3 to FIG. 5 together, the sum of the electrode sheet width W and the electrode slit width S of the first slit electrode 210 in the sub-pixel element 209 in the first color, the sum of the electrode sheet width W and the electrode slit width S of the second slit electrode 212 in the sub-pixel element 211 in the second color, and the sum of the electrode sheet width W and the electrode slit width S of the third slit electrode 214 in the sub-pixel element 213 in the third color are the same.

Moreover as illustrated in FIG. 4, the electrode sheet widths W of the first slit electrodes 210 in the sub-pixel elements 209 in the first color in the pixel elements 208 increment, and the electrode slit widths S of the first slit electrodes 210 decrement, from the first zone to the N-th zone.

Furthermore the first substrate 202 is a thin film transistor array substrate, and the second substrate 205 is a color filter substrate.

Furthermore the first slit electrodes 210, the second slit electrodes 212, and the third slit electrodes 214 in the pixel elements 208 are pixel electrodes; or the first slit electrodes 210, the second slit electrodes 212, and the third slit electrodes 214 in the pixel elements 208 are common electrodes. In the embodiment of the disclosure, the first slit electrodes 210, the second slit electrodes 212, and the third slit electrodes 214 in the pixel elements are described as pixel electrodes merely by way of an example, and reference can be made to the description of the embodiment of the disclosure for the first slit electrodes 210, the second slit electrodes 212, and the third slit electrodes 214 in the pixel elements being common electrodes, so a repeated description thereof will be omitted here.

The first slit electrodes 210, the second slit electrodes 212, and the third slit electrodes 214 in the pixel elements 208 can be made of indium tin oxide or another material. Preferably they can be made of metal oxide or the like for an improved transmissivity of the display panel.

In the embodiment of the disclosure, the electrode sheet widths W of the first slit electrodes 210 in the sub-pixel elements 209 in the first color in the pixel elements 208 increment from the first zone to the N-th zone, and for the second slit electrodes 212, there are a uniform electrode sheet width and a uniform electrode slit width of the second slit electrodes 212 in each zone; and the electrode sheet width of the second slit electrodes 212 in the pixel elements in the i-th zone is greater than the electrode sheet width of the second slit electrodes 212 in the pixel elements in the (i+1)-th zone, and the electrode slit width of the second slit electrodes 212 in the pixel elements in the i-th zone is less than the electrode slit width of the second slit electrodes 212 in the pixel elements in the (i+1)-th zone.

Preferably the electrode sheet widths W of the first slit electrodes 210 in the sub-pixel elements 209 in the first color in the pixel elements 208 increment from the first zone to the N-th zone, and for the third slit electrodes 214, there are a uniform electrode sheet width and a uniform electrode slit width of the third slit electrodes 214 in each zone; the electrode sheet width of the third slit electrodes 214 in the pixel elements in the x-th zone is less than the electrode sheet width of the third slit electrodes 214 in the pixel elements in the (x+1)-th zone, and the electrode slit width of the third slit electrodes 214 in the pixel elements in the x-th zone is greater than the electrode slit width of the third slit electrodes 214 in the pixel elements in the (x+1)-th zone; and the electrode sheet width of the third slit electrodes 214 in the pixel elements in the y-th zone is greater than the electrode sheet width of the third slit electrodes 214 in the pixel elements in the (y+1)-th zone, and the electrode slit width of the third slit electrodes 214 in the pixel elements in the y-th zone is less than the electrode slit width of the third slit electrodes 214 in the pixel elements in the (y+1)-th zone; or The electrode sheet width of the third slit electrodes 214 in the pixel elements in the x-th zone is greater than the electrode sheet width of the third slit electrodes 214 in the pixel elements in the (x+1)-th zone, and the electrode slit width of the third slit electrodes 214 in the pixel elements in the x-th zone is less than the electrode slit width of the third slit electrodes 214 in the pixel elements in the (x+1)-th zone; and the electrode sheet width of the third slit electrodes 214 in the pixel elements in the y-th zone is less than the electrode sheet width of the third slit electrodes 214 in the pixel elements in the (y+1)-th zone, and the electrode slit width of the third slit electrodes 214 in the pixel elements in the y-th zone is greater than the electrode slit width of the third slit electrodes 214 in the pixel elements in the (y+1)-th zone, where $1 \leq x < y \leq N$.

There is a correspondence relationship between the electrode sheet width of the slit electrode in each sub-pixel element in some color and the transmissivity Tr % of the sub-pixel element in the color, so the electrode sheet widths of the slit electrodes in the different zones on the display panel can be set different, so that there are different transmissivities Tr % of the sub-pixel elements in the color in the different zones, thus controlling uniformity in chroma on the display panel. For example, a relationship between the electrode sheet width W of a slit electrode, the width S of an electrode slit in the slit electrode, and the transmissivity Tr % of a pixel element in the display panel can be as depicted in Table 1 as a result of simulation according to the embodiment of the disclosure.

TABLE 1

| Tr % | W (mm) | S (mm) |
|---|---|---|
| 0.94 | 2.768 | 2.232 |
| 0.95 | 2.84 | 2.16 |
| 0.96 | 2.912 | 2.088 |
| 0.97 | 2.984 | 2.016 |
| 0.98 | 3.056 | 1.944 |
| 0.99 | 3.128 | 1.872 |
| 1 | 3.2 | 1.8 |

For example, the transmissivity Tr % required for a sub-pixel element in the first color in the i-th zone is 0.95, and at this time the electrode sheet width W=2.84 mm of the first slit electrode 210, and the slit width S=2.16 mm of the first slit electrode 210, in the sub-pixel element 209 in the first color can be determined based on the correspondence relationship between the electrode sheet width W of the slit electrode and the transmissivity in Table 1.

The relationship between the electrode sheet width W of the slit electrode and the transmissivity Tr % of the pixel element in the display panel was derived from the simulation, so the relationship between the electrode sheet width W of the slit electrode and the transmissivity Tr % of the pixel element in the display panel needs to be determined under different conditions.

The transmissivities Tr % of the sub-pixel elements in the first color, the sub-pixel elements in the second color, and the sub-pixel elements in the third color in the pixel elements can be determined based on test display values of the pixel elements, and target chromas in the zones where the pixel elements are arranged, particularly as follows: chroma coordinates in the respective colors, and display brightness values in the respective colors, of the pixel elements with light in the first color, light in the second color, light in the third color, and light in the fourth color are determined as the test display values; target display brightness values in the respective colors are determined based on the preset target chromas in the zones where the pixel elements are arranged and the test display values; and the transmissivities of the sub-pixel elements in the first color, the sub-pixel elements in the second color, and the sub-pixel elements in the third color in the pixel elements are determined based on the display brightness values in the respective colors, and the target display brightness values in the respective colors. Preferably the light in the first color, the light in the second color, the light in the third color, and the light in the fourth color are white blue, blue light, red light and green light respectively. Backlight chroma coordinates and a brightness value of a backlight in each zone on the display panel transmitted through the light guider, and chroma coordinates and brightness values of blue light, green light and red light among the backlight in each zone are determined as the test display values, where the backlight in each zone is white light.

The target display brightness values corresponding to the sub-pixel elements in the first color, the target display brightness values corresponding to the sub-pixel elements in the second color, and the target display brightness values corresponding to the sub-pixel elements in the third color in the respective zones provided with light at the target chromas are determined in the chroma coordinate equations, so that the transmissivities corresponding to the sub-pixel elements in the first color, the transmissivities corresponding to the sub-pixel elements in the second color, and the transmissivities corresponding to the sub-pixel elements in the third color are determined.

Finally the electrode sheet width of the slit electrode in each sub-pixel element in the respective color is determined based on the relationship between the transmissivity and the electrode sheet width of the slit electrode.

In each zone, the electrode sheet width and the electrode slit width of the second slit electrodes 212 are determined based on the transmissivity of the sub-pixel elements 209 in the first color, the transmissivity of the sub-pixel elements 213 in the third color, and the target chroma in the zone; or the electrode sheet width and the electrode slit width of the third slit electrodes 213 are determined based on the transmissivity of the sub-pixel elements 209 in the first color, the transmissivity of the sub-pixel elements 211 in the second color, and the target chroma in the zone, where each zone corresponds to a target chroma, and differences in target chroma between the different zones do not exceed a preset threshold; and the electrode sheet width and the electrode slit width of the first slit electrodes 210 correspond to the transmissivity of the sub-pixel elements 209 in the first color, the electrode sheet width and the electrode slit width of the second slit electrodes 212 correspond to the transmissivity of the sub-pixel elements 211 in the second color, and the electrode sheet width and the electrode slit width of the third slit electrodes 214 correspond to the transmissivity of the sub-pixel elements 213 in the third color.

The electrode sheet width of the first slit electrodes, and the electrode slit width of the first slit electrodes, in the sub-pixel elements in the first color in each zone on the display panel can be determined particularly as follows.

In a first approach, the chroma coordinates in the respective colors and the display brightness values in the respective colors in each zone on the display panel, with differences in color, with light in the first color, light in the second color, light in the third color and light in the fourth color are measured as the test display values, where the light in the first color is white light, light in the second color is blue light, light in the third color is red light, and light in the fourth color is green light. The target display brightness value corresponding to the sub-pixel elements in the first color, the target display brightness value corresponding to the sub-pixel elements in the second color, and the target display brightness value corresponding to the sub-pixel elements in the third color in each zone on the display panel are determined; and then the electrode sheet width of the slit electrodes in the sub-pixel elements in the respective color is determined based on the target display brightness value of the sub-pixel elements in the color and the test display value of the sub-pixel elements in the color, particularly as follows:

In a first operation, the display panel is divided into N zones at respective distances from the backlight source in the horizontal direction, where the first zone is at the shortest distance from the backlight source, and the N-th area is at the longest distance from the backlight source, and N is a positive integer; and in this display panel, there is a uniform transmissivity of the sub-pixel element in the first color, the sub-pixel element in the second color, and the sub-pixel element in the third color in each pixel element, that is, the electrode sheet width of the first slit electrode, the electrode sheet width of the second slit electrode, and the electrode sheet width of the third slit electrode in each pixel element are the same, i.e. $W^{old}$; and also the electrode slit width of the first slit electrode, the electrode slit width of the second slit electrode, and the electrode slit width of the third slit electrode in each pixel element are the same, i.e., $S^{old}$. The light guider of the display panel is made of poly (methyl methacrylate), so this display pane is a display panel with differences in color.

In a second operation, the chroma coordinates and the brightness value of light in each color in the 1931 CIE-XYZ standard chroma system in each zone on the display panel respectively with white light, blue light, green light and red light are measured as the test display values. In the embodiment of the disclosure, white light displayed on the display panel refers to a uniform pixel grayscale value (255, 255, 255) of each pixel in a display image; blue light displayed on the display panel refers to a uniform pixel grayscale value (255, 0, 0) of each pixel in the display image; red light displayed on the display panel refers to a uniform pixel grayscale value (0, 255, 0) of each pixel in the display image; and green light displayed on the display panel refers to a uniform pixel grayscale value (0, 0,255) of each pixel in the display image. White light is displayed in the i-th zone at the chroma coordinates $W_i^x$ and, and $W_i^y$, and with the brightness value $W_i^y$; blue light is displayed in the i-th zone at the chroma coordinates $B_i^x$ and $B_i^y$, and with the brightness value $B_i^y$; red light is displayed in the i-th zone at the chroma coordinates $R_i^x$ and $R_i^y$, and with the brightness value $R_i^y$; and green light is displayed in the i-th zone at the chroma coordinates $G_i^x$ and $G_i^y$, and with the brightness value $G_i^y$. $W^y = R_i^y + G_i^y + B_i^y$ holds true because the light in each color is composed of light in three colors, i.e., red, green and blue, at different proportions.

In a third operation, the target chroma coordinates $O_i^x$ and $O_i^y$ of light in a target color displayed on the display panel in the i-th zone, which are coordinates in the 1931 CIE-XYZ standard chroma system, are determined. The target chroma coordinates of light in the target color in each zone refer to chroma coordinates in each zone on the display panel when white light is displayed. Preferably there are uniform target chroma coordinates in each zone. Alternatively target chroma coordinates may vary across the respective zones, and when target chroma coordinates vary across the respective zones, the differences in target chroma coordinates between the zones need to be controlled below a preset threshold of typically 0.5%.

In a fourth operation, the chroma coordinates $W_i^x$ and $W_i^y$, and the brightness value $W_i^y$ in the i-th zone when white light is displayed, the chroma coordinates $B_i^x$ and $B_i^y$ in the i-th zone when blue light is displayed, the chroma coordinates $R_i^x$ and $R_i^y$ in the i-th zone when red light is displayed, and the chroma coordinates $G_i^x$ and $G_i^y$ in the i-th zone when green light is displayed are substituted into the following chroma coordinate equations, and the target display brightness value $OB_i^y$ of blue light, the target display brightness value $OB_i^y$ of red light, and the target display brightness value $OG_i^y$ of green light among light at the target chroma displayed in the i-th zone are determined:

$$O_i^x = \frac{\frac{R_i^x * OR_i^y}{R_i^y} + \frac{G_i^x * OG_i^y}{G_i^y} + \frac{B_i^x * OB_i^y}{B_i^y}}{\frac{R_i^y * OR_i^y}{R_i^y} + \frac{G_i^y * OG_i^y}{G_i^y} + \frac{B_i^y * OB_i^y}{B_i^y} + W_i^y + \frac{OR_i^y}{R_i^y} - \frac{OR_i^y}{R_i^x * R_i^y} - OR_i^y + \frac{OG_i^y}{G_i^y} - \frac{OG_i^y}{G_i^x * G_i^y} - OG_i^y + \frac{OB_i^y}{B_i^y} - \frac{OB_i^y}{B_i^x * B_i^y} - OB_i^y},$$

and $$O_i^x = \frac{OR\frac{y}{i} + OG\frac{y}{i} + OB\frac{y}{i}}{\frac{R_i^y * OR_i^y}{R_i^y} + \frac{G_i^y * OG_i^y}{G_i^y} + \frac{B_i^y * OB_i^y}{B_i^y} + W_i^y + \frac{OR_i^y}{R_i^y} - \frac{OR_i^y}{R_i^x * R_i^y} - OR_i^y + \frac{OG_i^y}{G_i^y} - \frac{OG_i^y}{G_i^x * G_i^y} - OG_i^y + \frac{OB_i^y}{B_i^y} - \frac{OB_i^y}{B_i^x * B_i^y} - OB_i^y}.$$

$OB_i^y$ $OR_i^y$ and $OG_i^y$ are unknowns in the chroma coordinate equations above, and, and $OB_i^y$ $OR_i^y$ and $OG_i^y$ satisfying the chroma coordinate equations above are determined as a result of repeated iterative calculations.

In a fifth operation, the ratio Yi of the target display brightness value $OB_i^y$ to $B_i^y$, in the i-th zone is determined, and at this time the electrode sheet width $W_i^{new}$ of the first slit electrodes in the i-th zone is determined as $W_i^{new} = Y_i * W_i^{old}$. After the electrode sheet width of the first slit electrodes in the i-th zone is determined, the slit width $S_i^{new}$ of the first slit electrodes in the i-th zone is determined as $S_i^{new} = W^{old} + S^{old} - W_i^{new}$. Alike the electrode sheet width of the second slit electrodes, and the slit width of the second slit electrodes, and the electrode sheet width of the third slit electrodes, and the slit width of the third slit electrodes, in the i-th zone, can be determined.

Finally the display panel is fabricated at the determined electrode sheet width $W_i^{new}$ of the first slit electrodes, and slit width $S_i^{new}$ of the first slit electrodes, in each zone.

In a second approach, the backlight chroma coordinates and the brightness value of the backlight in each zone on the display panel transmitted through the light guider, and the chroma coordinates and the brightness values of blue light, green light and red light among the backlight in each zone are determined as the test display values; the target display brightness values corresponding to the sub-pixel elements in the first color, the target display brightness values corresponding to the sub-pixel elements in the second color, and the target display brightness values corresponding to the sub-pixel elements in the third color in the respective zones provided with light at the target chromas are determined, so that the transmissivities corresponding to the sub-pixel elements in the first color, the transmissivities corresponding to the sub-pixel elements in the second color, and the transmissivities corresponding to the sub-pixel elements in the third color are determined; and finally the electrode sheet width of the slit electrode in each sub-pixel element in the respective color is determined based on the relationship between the transmissivity and the electrode sheet width of the slit electrode, particularly as follows:

In a first operation, the display panel is divided into N zones at respective distances from the backlight source in the horizontal direction, where the first zone is at the shortest distance from the backlight source, and the N-th area is at the longest distance from the backlight source, and N is a positive integer.

In a second operation, spectroscopic spectrums of blue light, green light and red light in the backlight source are filtered at spectroscopic transmissivities of a color filter to the blue light, the green light and the red light among the backlight, and the chroma coordinates and the brightness values of the backlight, the blue light among the backlight, the green light among the backlight, and the red light among the backlight respectively in the 1931 CIE-XYZ standard chroma system are determined. They can be determined particularly as in the prior art, for example, they can be measured in optical software without any limitation thereto. Particularly the backlight light is displayed in the i-th zone at the chroma coordinates $W_i^x$ and $W_i^y$, and with the brightness value $W_i^y$; the blue light among the backlight is displayed in the i-th zone at the chroma coordinates $B_i^x$ and $B_i^y$, and with the brightness value $B_i^y$; the red light among the backlight is displayed in the i-th zone at the chroma coordinates $R_i^y$ and $R_i^y$, and with the brightness value $R_i^y$; and the green light among the backlight is displayed in the i-th zone at the chroma coordinates $G_i^x$ and $G_i^y$, and with the brightness value $G_i^y$. $W_i^y = R_i^y + G_i^y + B_i^y$ holds true because the backlight is composed of the light in three colors, i.e., red, green and blue, at different proportions.

In a third operation, the target chroma coordinates $O_i^x$ and $O_i^y$ of light in a target color displayed on the display panel in the i-th zone, which are coordinates in the 1931 CIE-XYZ standard chroma system, are determined. Preferably there are uniform target chroma coordinates of light in the target color in each zone. Alternatively target chroma coordinates of light in the target color may vary across the respective zones, and when target chroma coordinates of light in the target color vary across the respective zones, the differences in target chroma coordinates of light in the target color between the zones need to be controlled below a preset threshold of typically 0.5%.

In a fourth operation, the chroma coordinates $W_i^x$ and $W^y$, and the brightness value $W_i^y$ in the i-th zone when the backlight is displayed, the chroma coordinates $B_i^x$ and $B_i^y$ in the i-th zone when the blue light among the backlight is displayed, the chroma coordinates $R_i^x$ and $R_i^y$ in the i-th zone when the red light among the backlight is displayed, and the chroma coordinates $G_i^x$ and $G_i^y$ in the i-th zone when the green light among the backlight is displayed are substituted into the following chroma coordinate equations, and the target display brightness value $OB_i^y$ of the blue light, the target display brightness value $OR_i^y$ of the red light, and the target display brightness value $OG_i^y$ of the green light among the light at the target chroma displayed in the i-th zone are determined:

$$O_i^x = \frac{\frac{R_i^x * OR_i^y}{R_i^y} + \frac{G_i^x * OG_i^y}{G_i^y} + \frac{B_i^x * OB_i^y}{B_i^y}}{\frac{R_i^y * OR_i^y}{R_i^y} + \frac{G_i^y * OG_i^y}{G_i^y} + \frac{B_i^y * OB_i^y}{B_i^y} + W_i^y + \frac{OR_i^y}{R_i^y} - \frac{OR_i^y}{R_i^x * R_i^y} -}$$

$$OR_i^y + \frac{OG_i^y}{G_i^y} - \frac{OG_i^y}{G_i^x * G_i^y} - OG_i^y + \frac{OB_i^y}{B_i^y} - \frac{OB_i^y}{B_i^x * B_i^y} - OB_i^y$$

and $$O_i^x = \frac{OR\frac{y}{i} + OG\frac{y}{i} + OB\frac{y}{i}}{\frac{R_i^y * OR_i^y}{R_i^y} + \frac{G_i^y * OG_i^y}{G_i^y} + \frac{B_i^y * OB_i^y}{B_i^y} + W_i^y + \frac{OR_i^y}{R_i^y} - \frac{OR_i^y}{R_i^x * R_i^y} -}$$

$$OR_i^y + \frac{OG_i^y}{G_i^y} - \frac{OG_i^y}{G_i^x * G_i^y} - OG_i^y + \frac{OB_i^y}{B_i^y} - \frac{OB_i^y}{B_i^x * B_i^y} - OB_i^y$$

$OB_i^y$ $OR_i^y$, and $OG_i^y$ are unknows in the chroma coordinate equations above, and, and $OB_i^y$ $OR_i^y$, and $OG_i^y$ satisfying the chroma coordinate equations above are determined as a result of repeated iterative calculations.

In a fifth operation, the transmissivity of the sub-pixel elements in the first color in the i-th zone is determined as the ratio of $OB_i^y$ to $B_i^y$, and then the electrode sheet width $W_i^{new}$ of the first slit electrodes in the i-th zone is determined based on the relationship between the transmissivity and the electrode sheet width W of the slit electrodes. After the electrode sheet width $W_i^{new}$ of the first slit electrodes in the i-th zone is determined, the slit width $S_i^{new}$ of the first slit electrodes in the i-th zone is determined as $W_i^{new} = W^{old} + S^{old} - W_i^{new}$. Alike the transmissivity of the sub-pixel elements in the second color in the i-th zone is determined as the ratio of $OR_i^y$ to $R_i^y$ in the i-th zone; and the transmissivity of the sub-pixel elements in the third color in the i-th zone is determined as the ratio of $OG_i^y$ to $G_i^y$ in the i-th zone. Finally the electrode sheet width of the second slit electrodes, and the electrode sheet width of the third slit electrodes, in the i-th zone are determined based on the relationship between the electrode sheet width of the slit electrodes and the transmissivity of the pixel element in the display panel.

In the approaches above, there are two equations with three unknowns, and repeated iterative calculations need to performed, so that both sides of the equations hold true. Thus the electrode sheet width of the second slit electrodes 212 in the sub-pixel elements 211 in the second color may be different from the electrode sheet width of the third slit electrodes 214 in the sub-pixel elements 213 in the third color in the different zones, and the electrode sheet width of the first slit electrodes 210 in the sub-pixel elements 209 in the first color in the pixel elements in each zone on the display panel can be determined by adjusting adaptively the electrode sheet width of the second slit electrodes 212 in the sub-pixel elements 211 in the second color, and the electrode sheet width of the third slit electrodes 214 in the sub-pixel elements 213 in the third color to thereby determine the target chroma coordinates. The three unknowns can be calculated iteratively by determining two unknowns and thus the remaining third unknown.

An embodiment of the disclosure provides a display device including the display panel above. The other components of the display device are structured as in the prior art, so a repeated description thereof will be omitted here.

The display device can be applicable to a computer, a TV set, a handset, a tablet PC and other terminals.

In summary, an embodiment of the disclosure provides a display panel divided into a plurality of zones, where the electrode plate width of and the electrode slit width of a first slit electrode in a sub-pixel element in a first color in a pixel element in each zone are different from those in another zone, so that the sub-pixel elements in the first color in the pixel elements in the different zones display at different transmissivities to thereby adjust chromas displayed on the display panel in the different zones. Moreover the electrode sheet width of the first slit electrodes in the sub-pixel elements in the first color in a zone at a shorter distance from a light source is set wider, and the electrode slit width of these first slit electrodes is set narrower, dependent upon the distance of each zone from the light source, so that more light is transmitted through the sub-pixel elements in the first color in the zone at a longer distance from the light source, thereby compensating for light absorbed by a light guider so as to address the problem of non-uniformity in chroma displayed on the display panel.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A display panel, comprising:
    a sided-illuminating backlight module;
    a first substrate; and
    a second substrate,
    wherein the sided-illuminating backlight module comprises:
        a light guider, and
        a backlight source,
    wherein the first substrate comprises:
        a plurality of pixel elements arranged in an array, each comprising a sub-pixel element in a first color and having a first slit electrode therein,
    wherein:
        the first substrate is divided into N zones at respective distances from the backlight source in the horizontal direction, wherein N is a positive integer,
        there are a uniform electrode sheet width and a uniform electrode slit width of the first slit electrodes in the pixel elements in each zone,
        the electrode sheet width of the first slit electrodes in the pixel elements in the i-th zone is less than the electrode sheet width of the first slit electrodes in the pixel elements in the (i+1)-th zone,
        the electrode slit width of the first slit electrodes in the pixel elements in the i-th zone is greater than the electrode slit width of the first slit electrodes in the pixel elements in the (i+1)-th zone,
        $1 \leq i < N$, and
        the i-th zone is at a shorter distance from the backlight source than the (i+1)-th zone.

2. The display panel of claim 1, wherein the light guider comprises poly (methyl methacrylate), and the sub-pixel elements in the first color are blue sub-pixel elements.

3. The display panel of claim 1, wherein the plurality of pixel elements further comprises:
a plurality of sub-pixel elements in a second color, and
a plurality of sub-pixel elements in a third color,
wherein second slit electrodes are arranged in the sub-pixel elements in the second color, and third slit electrodes are arranged in the sub-pixel elements in the third color, and wherein in the same zone:
an electrode sheet width and an electrode slit width of the second slit electrodes are determined based on a transmissivity of the sub-pixel elements in the first color, a transmissivity of the sub-pixel elements in the third color, and a target chroma in the area; or
an electrode sheet width and an electrode slit width of the third slit electrodes are determined based on the transmissivity of the sub-pixel elements in the first color, a transmissivity of the sub-pixel elements in the second color, and the target chroma in the area,
wherein:
each zone corresponds to a target chroma, and differences in target chroma between the different zones do not exceed a preset threshold;
the electrode sheet width and the electrode slit width of the first slit electrodes correspond to the transmissivity of the sub-pixel elements in the first color;
the electrode sheet width and the electrode slit width of the second slit electrodes correspond to the transmissivity of the sub-pixel elements in the second color; and
the electrode sheet width and the electrode slit width of the third slit electrodes correspond to the transmissivity of the sub-pixel elements in the third color.

4. The display panel of claim 3, wherein:
there are a uniform electrode sheet width and a uniform electrode slit width of the second slit electrodes in each zone;
the electrode sheet width of the second slit electrodes in the pixel elements in the i-th zone is greater than the electrode sheet width of the second slit electrodes in the pixel elements in the (i+1)-th zone; and
the electrode slit width of the second slit electrodes in the pixel elements in the i-th zone is less than the electrode slit width of the second slit electrodes in the pixel elements in the (i+1)-th zone.

5. The display panel of claim 3, wherein:
there are a uniform electrode sheet width and a uniform electrode slit width of the third slit electrodes in each zone;
wherein either:
A) the electrode sheet width of the third slit electrodes in the x-th zone is less than the electrode sheet width of the third slit electrodes in the (x+1)-th zone;
the electrode slit width of the third slit electrodes in the x-th zone is greater than the electrode slit width of the third slit electrodes in the (x+1)-th zone;
the electrode sheet width of the third slit electrodes in the y-th zone is greater than the electrode sheet width of the third slit electrodes in the (y+1)-th zone; and
the electrode slit width of the third slit electrodes in the y-th zone is less than the electrode slit width of the third slit electrodes in the (y+1)-th zone; or
B) the electrode sheet width of the third slit electrodes in the x-th zone is greater than the electrode sheet width of the third slit electrodes in the (x+1)-th zone;
the electrode slit width of the third slit electrodes in the x-th zone is less than the electrode slit width of the third slit electrodes in the (x+1)-th zone;
the electrode sheet width of the third slit electrodes in the y-th zone is less than the electrode sheet width of the third slit electrodes in the (y+1)-th zone; and
the electrode slit width of the third slit electrodes in the y-th zone is greater than the electrode slit width of the third slit electrodes in the (y+1)-th zone, and
wherein $1 \leq x < y \leq N$.

6. The display panel of claim 3, wherein the transmissivities of the sub-pixel elements in the first color, of the sub-pixel elements in the second color, and of the sub-pixel elements in the third color in the pixel elements are determined based on test display values of the pixel elements, and target chromas in the zones where the pixel elements are arranged.

7. The display panel of claim 6, wherein the transmissivities of the sub-pixel elements in the first color, of the sub-pixel elements in the second color, and of the sub-pixel elements in the third color in the pixel elements are determined based on the test display values of the pixel elements, and the target chromas in the zones where the pixel elements are arranged by:
determining chroma coordinates in the respective colors, and display brightness values in the respective colors, of the pixel elements with light in the first color, light in the second color, light in the third color, and light in a fourth color as the test display values;
determining target display brightness values in the respective colors from the preset target chromas in the zones where the pixel elements are arranged and the test display values; and
determining the transmissivities of the sub-pixel elements in the first color, the sub-pixel elements in the second color, and the sub-pixel elements in the third color in the pixel elements from the display brightness values in the respective colors, and the target display brightness values in the respective colors.

8. The display panel of claim 3, wherein the light guider comprises poly (methyl methacrylate), the sub-pixel elements in the first color are blue sub-pixel elements, the sub-pixel elements in the second color are red sub-pixel elements, and the sub-pixel elements in the third color are green sub-pixel elements.

9. The display panel of claim 3, wherein the second slit electrodes and the third slit electrodes in the respective pixel elements are shaped the same as the first slit electrodes.

10. The display panel of claim 9, wherein there is a uniform size of the N zones.

11. The display panel of claim 9, wherein respective electrode sheets in the first slit electrodes are connected through bodies of the first slit electrodes and arranged in parallel.

12. The display panel of claim 9, wherein the first slit electrodes, the second slit electrodes, and the third slit electrodes are pixel electrodes; or
the first slit electrodes, the second slit electrodes and the third slit electrodes are common electrodes.

13. A display device, comprising a display panel, the display panel comprising a sided-illuminating backlight module;
a first substrate; and
a second substrate, wherein the sided-illuminating backlight module comprises:
a light guider, and
a backlight source,
wherein the first substrate comprises:
a plurality of pixel elements arranged in an array, each comprising a sub-pixel element in a first color and having a first slit electrode therein,
wherein:
the first substrate is divided into N zones at respective distances from the backlight source in the horizontal direction, wherein N is a positive integer,
there are a uniform electrode sheet width and a uniform electrode slit width of the first slit electrodes in the pixel elements in each zone,
the electrode sheet width of the first slit electrodes in the pixel elements in the i-th zone is less than the electrode sheet width of the first slit electrodes in the pixel elements in the (i+1)-th zone,
the electrode slit width of the first slit electrodes in the pixel elements in the i-th zone is greater than the electrode slit width of the first slit electrodes in the pixel elements in the (i+1)-th zone,
$1 \leq i < N$, and
the i-th zone is at a shorter distance from the backlight source than the (i+1)-th zone.

* * * * *